United States Patent [19]

Tollerud

[11] Patent Number: 5,632,458
[45] Date of Patent: May 27, 1997

[54] LOCK BOX AND STAND

[76] Inventor: Mark Tollerud, 219 Dean Rd., Esko, Minn. 55733

[21] Appl. No.: 303,658

[22] Filed: Sep. 9, 1994

[51] Int. Cl.[6] .................................................. A47B 5/04
[52] U.S. Cl. ........................ 248/121; 248/126; 248/159; 248/444.1
[58] Field of Search ........................... 248/551, 552, 248/553, 444.1, 158, 121, 48.2, 126, 205.1, 159; 232/19, 20, 39, 33, 24–26, 17, 1 A

[56] References Cited

U.S. PATENT DOCUMENTS

| 435,306 | 8/1890 | Hill | 232/24 |
|---|---|---|---|
| 465,524 | 12/1891 | Griffin | 232/24 |
| 533,697 | 2/1895 | Baker | 248/158 |
| 965,566 | 7/1910 | Cooley | 232/39 |
| 2,049,607 | 8/1936 | Emerson et al. | 248/158 |
| 2,418,067 | 3/1947 | Carpenter | 248/121 |
| 2,521,355 | 9/1950 | Ford | 248/121 |
| 3,079,725 | 3/1963 | Fleur | 248/441.1 |
| 3,313,513 | 4/1967 | Howell | 248/121 |
| 4,333,603 | 6/1982 | Carlson | 232/24 |
| 4,549,366 | 10/1985 | Gerding et al. | 248/185 |
| 4,726,512 | 2/1988 | White | 232/17 |

Primary Examiner—Ramon O. Ramirez
Assistant Examiner—Derek J. Berger
Attorney, Agent, or Firm—Paul H. Gallagher

[57] ABSTRACT

A stand including a base and a standard made up of common tubular elements. An L-shape bracket is detachably mounted on the top of the standard. A lock box is mounted on the bracket. The bracket alternatively can be detached from the stand and mounted on a wall.

1 Claim, 1 Drawing Sheet

U.S. Patent  May 27, 1997  5,632,458
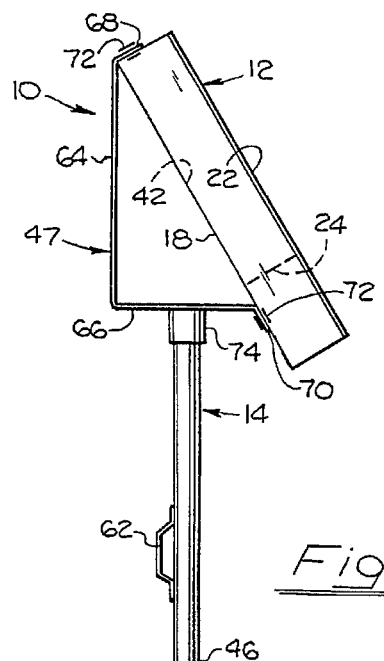
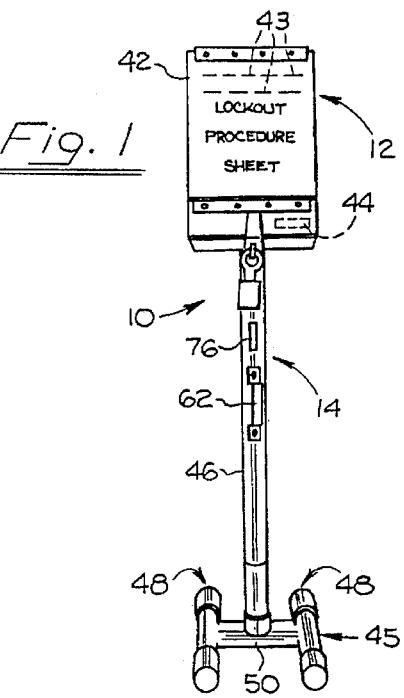
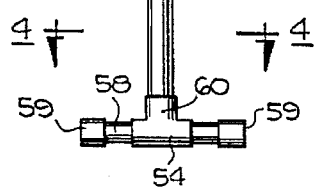
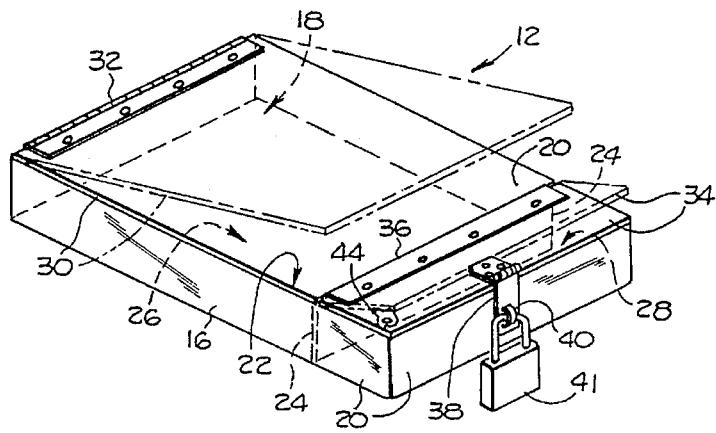
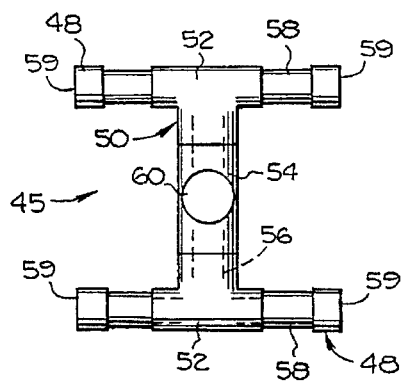
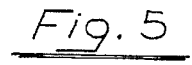
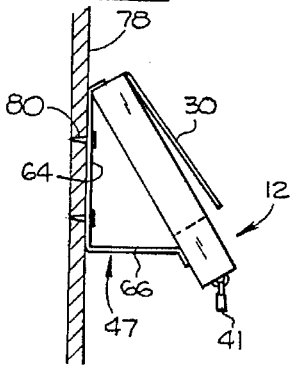
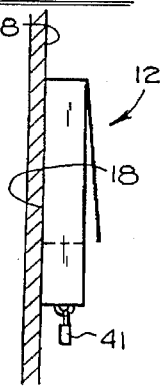

LOCK BOX AND STAND

SUMMARY OF THE INVENTION

The device of the invention is used in a manufacturing plant having operating machines. An operation or custom exists, in which one or more machines are utilized, and when a repair to a machine is required, the machine is shut down for such repair. The person responsible for the repair, places a padlock on the machine to lock it out of operation, then places the lock in a control station showing the lockout condition, and correspondingly preventing the machine from being put back in operation by an unauthorized person.

The lockout station mentioned, is under the control of a foreman or other authorized person, and it includes means for holding and/or locking keys therein. This station includes a lockout box.

An object of the present invention is to provide a stand for use with such a lockout box. The stand is portable and easily put in place or manipulated by the authorized person.

Another object is to provide such a stand that is of extremely simple construction, and can be used effectively and conveniently for holding the lock box and the keys.

Another object is to provide such a device, in which the stand has a bracket for mounting the lock box, and the bracket and the lock box are of such construction as to facilitate detachably mounting the lock box on the bracket, or on a wall, selectively.

BRIEF DESCRIPTIONS OF THE INDIVIDUAL FIGURES OF THE DRAWINGS

FIG. 1 is an elevational front view of the device.

FIG. 2 is perspective view of the lock box.

FIG. 3 is side view, taken from the left of FIG. 1.

FIG. 4 is a view taken at line 4—4 of FIG. 3.

FIG. 5 is a side view of the lock box, and mounting bracket, mounted on a wall, separate from the stand.

FIG. 6 is a side view of the lock box itself, without the mounting bracket, mounted on the wall.

Referring in detail to the drawings, the entire device is indicated at 10 in FIGS. 1 and 3 and includes a lock box 12 and a stand 14.

The lock box 12 is shown in its entirety in FIG. 2 and includes a box proper 16 having a bottom element or back element 18 (see also FIG. 3) and surrounding side walls 20. The lock box has a normal open front side 22, and has a partition wall 24, dividing the interior into a relatively large compartment 26 and a small compartment 28. These compartments may also be referred to as upper and lower compartments respectively, corresponding to relative positions assumed when the box is in use.

A cover 30 is hinged at 32 for covering the large compartment and a cover 34 is hinged at 36, on the partition 24, for closing the smaller compartment. A hasp 38 is provided on the small cover 34 and cooperates with a lock loop 40 for locking the cover closed, by a padlock 41. The covers 30, 34 are preferably transparent, and the entire box may be transparent as well.

In the use of the lock box, a pack of instruction sheets 42 (FIG. 1) are normally placed in the large compartment, with instructions 43 thereon, which may be visible through the cover. The small compartment may be utilized for placing keys 44 therein, for the machines mentioned, when such machines are shut down.

The stand 14 includes a base 45, a standard 46, and a mounting bracket 47.

The base 45 and standard 46 are of simple design and construction constituting an important feature of the invention, these components being made up of common items presently found on the market. The base 45 is of H-shape (FIGS. 1,4) having two parallel side bars or elements 48 and a cross bar or element 50, made up of tubular elements. Each of the side bars includes a tee 52 (FIG. 4), and the cross bar includes a tee 54. These tees are interconnected by short tubular elements 56 threaded therewith. Connected to the tees 52 are other short tubular elements 58, and on the outer ends of these elements are caps 59. The caps 59 may also be referred to herein as tubular elements.

The tee 54 (FIGS. 3,4) in the cross bar is arranged with the central element 60 extending upward, and a long tubular element constituting the standard 46 is threaded in the element 60, and the bracket 47 is mounted on this standard. Preferably a hand grip or handle 62 is secured to the standard, and as referred to again hereinbelow, is located at a particular balancing position. The base and standard may be of any desired material, such as known extruded plastic items.

The bracket 47 is angle shaped (FIG. 3) and includes a back upright element 64 and a bottom element 66, preferably at a right angle to the element 64, the bottom element also being shorter than the upright element. At the top of the upright element and at the extended or remote end of the bottom element, are angle strips 68, 70 respectively for securing the lock box 12 in position on the bracket. These angle strips are preferably also at a right angle relative to each other for engagement by the corresponding surfaces of the lock box for securement thereto, such as by rivets 72. Secured to the undersurface of the bottom element 66 is a tubular mounting element 74 threadedly receiving the upper end of the standard 46, for mounting the bracket, and the lock box, on the standard.

If desired, a holder, indicated at 76 (FIG. 1) may be secured to the standard 46 for mounting padlocks, not then in use, but utilized as indicators for the convenience of all concerned.

The device as heretofore described may be placed at any desired location for the convenience of the personnel involved in the use thereof. The parts of the device including the bracket 47 are so constructed and arranged as to position the lock box 12 at a convenient angle (FIG. 3) for observation by the personnel of the instruction sheets 43 (FIGS. 1, 5). The large compartment constitutes a convenience for holding the instruction sheets, and the small compartment is utilized for holding padlocks, keys, etc., and with these items therein the entire device can be easily carried and manipulated for placement at any desired location, and at different locations with a minimum of effort.

The hand grip 62 (FIG. 3) as indicated above, is located for providing desired balance of the device, when it is carried or manipulated.

Another feature of the invention is that the lock box may be mounted on a wall (FIG. 5), instead of the stand, if that should be desired. In such mounting, the mounting bracket 47 with the box secured thereto, is mounted directly on the wall 78 and secured thereto as by a screw 80. It will be observed that the back element 64 of the bracket 47 is of planar shape and thus fits flat against the wall, and the box is disposed at the same angle it assumes on the stand. The entire lock box is then unobstructed for use by an authorized person in the same manner as when it is mounted on the stand.

It is also possible to secure the box directly on the wall 78, as shown in FIG. 6, although this is not a preferred way of mounting it.

I claim:

1. A stand for a lock box, and lock box, in combination, comprising, a lock box of substantial length having a back surface of planar shape, and a top surface perpendicular to the back surface, the stand comprising, a base, a standard mounted on the base, the base being composed essentially entirely of tubular elements including straight elements, tees and caps, the base being H-shape, having parallel side bars and a cross bar interconnecting them, the cross bar being made up of a plurality of interengaging tees, including a middle one having a central element directed upwardly, the parallel side bars each including a tee with straight elements extending therefrom and caps on the extended ends of the tees, the standard including an upright tubular element having its lower end connected with the central element of said middle tee in the cross bar, and an L-shape bracket mounted on the top end of the standard having angularly spaced arms, a lower one of which becomes a lower, horizontal arm when the bracket is so mounted, the bracket including a tubular element on and extending downwardly from the lower arm and secured to the upper end of the standard, the arms of the bracket being perpendicular to each other, the arms having angle strips at their extended ends disposed at acute angles to the main parts of the arms and at a right angle to each other and parallel respectively with the back surface and top surface of the lock box and engaging and secured to those surfaces, the angle strip on the lower arm being located adjacent the lower end of the lock box.

* * * * *